United States Patent
Yu et al.

(10) Patent No.: US 9,288,850 B2
(45) Date of Patent: Mar. 15, 2016

(54) CONTROL CIRCUITS, INTEGRATED CIRCUITS AND ILLUMINATING APPARATUSES HAVING THE SAME

(71) Applicant: Groups Tech Co., Ltd., Taipei (TW)

(72) Inventors: Ching Sheng Yu, New Taipei (TW); Chih Liang Wang, Keelung (TW); Kuang Hui Chen, New Taipei (TW)

(73) Assignee: Groups Tech Co., Ltd., Taipei (TW)

( * ) Notice: Subject to any disclaimer, the term of this patent is extended or adjusted under 35 U.S.C. 154(b) by 0 days.

(21) Appl. No.: 14/543,857

(22) Filed: Nov. 17, 2014

(65) Prior Publication Data

US 2015/0163869 A1 Jun. 11, 2015

(30) Foreign Application Priority Data

Dec. 11, 2013 (TW) .............................. 102145706 A
Sep. 10, 2014 (TW) .............................. 103131204 A

(51) Int. Cl.
*H05B 33/08* (2006.01)

(52) U.S. Cl.
CPC ................................ *H05B 33/0806* (2013.01)

(58) Field of Classification Search
CPC .......... H05B 33/0815; H05B 33/0818; H05B 37/029; H05B 37/02; H05B 41/3925
USPC .................. 315/191, 193, 122, 186, 201, 224
See application file for complete search history.

(56) References Cited

U.S. PATENT DOCUMENTS

| | | | | |
|---|---|---|---|---|
| 2010/0264836 A1* | 10/2010 | Godbole | ................... | 315/185 R |
| 2010/0308739 A1* | 12/2010 | Shteynberg et al. | .......... | 315/193 |
| 2010/0328946 A1* | 12/2010 | Borkar et al. | ............. | 362/249.02 |
| 2011/0181194 A1* | 7/2011 | Hum et al. | ..................... | 315/186 |
| 2012/0217887 A1* | 8/2012 | Kang et al. | ..................... | 315/193 |
| 2012/0229030 A1* | 9/2012 | Moskowitz et al. | .......... | 315/122 |
| 2012/0287684 A1* | 11/2012 | Fahlenkamp | .................. | 363/49 |
| 2013/0187561 A1* | 7/2013 | Franck et al. | ................. | 315/201 |
| 2014/0159593 A1* | 6/2014 | Chu et al. | ...................... | 315/191 |

* cited by examiner

*Primary Examiner* — Douglas W Owens
*Assistant Examiner* — Syed M Kaiser

(57) ABSTRACT

Disclosed are control circuits capable of auto-configuring two LED arrays either in parallel when the two LED arrays are operating off of 100±20% V AC voltage sources or in series when the two LED arrays are operating off of 200±20% V AC voltage sources according to the detection of the AC input voltage magnitude. The disclosed control circuits, ruling over the parallel or series configuration of the two LED arrays, could be implemented in discrete forms or as integrated circuits (IC).

20 Claims, 9 Drawing Sheets

CONTROL CIRCUITS, INTEGRATED CIRCUITS AND ILLUMINATING APPARATUSES HAVING THE SAME

CROSS-REFERENCE TO RELATED APPLICATIONS

This application claims the benefits of TW102145706, filed Dec. 11, 2013, and TW103131204, filed Sep. 10, 2014, the disclosures of which are fully incorporated herein by reference.

BACKGROUND OF THE INVENTION

1. Field of the Invention

The present invention relates to control circuits able to auto-configure two extrinsic LED arrays either in parallel or in series in accordance with the detection result of the AC input voltage range. The LED illuminating apparatuses auto-configured with the aid of disclosed control circuits could support dual-range (both 100±20% V and 200±20% V) operation, enabling a wider range of acceptable AC input.

2. Description of the Prior Art

As compared with the traditional lighting devices, the LED has a higher luminous efficacy. The LEDs can give off more than 100 lumens per watt because less electric energy is converted into waste heat. In sharp contrast, a traditional bulb only gives off about 15 lumens per watt because more electric energy is converted into waste heat. Moreover, LED-based lighting devices are gradually becoming preferred the lighting equipment because of having a relatively longer lifetime to reduce maintenance cost, being less susceptible to exterior interference, and being less likely to get damaged.

Technically, LEDs need to be DC-driven. So, an AC sinusoidal voltage source would normally be rectified by a full-wave or half-wave rectifier into a rectified sinusoidal voltage source before coming into use. Besides, the traditional AC-to-DC LED drivers usually require buck or boost converters to step down or up a rectified sinusoidal voltage source to a proper DC voltage level for normal operation, ending up with tons of shortcomings such as bulky and heavy design, conducted and radiated EMI, short lifetime, high cost, and so forth.

Traditional AC-direct LED light engines are only for single-range (either 100±20% V or 200±20% V) operation, narrowing the acceptable range of the AC input. To widen the acceptable range of the AC input, the inventors came up with the control circuits for series or parallel auto-configuration. With the aid of the disclosed control circuits for series or parallel auto-configuration, traditional AC-direct LED light engines could be easily upgraded from single-range (either 100±20% V or 200±20% V) operation to dual-range (both 100±20% V and 200±20% V) operation so as to enable a wider acceptable range of the AC input for worldwide applications.

In a nutshell, the main purpose of the present invention is to create control circuits so as to upgrade single-range (either 100±20% V or 200±20% V) operation to dual-range (both 100±20% V and 200±20% V) operation.

SUMMARY OF THE INVENTION

The present invention is directed to a control circuit able to auto-configure two extrinsic LED arrays either in parallel or in series according to the AC input voltage range, so that an illuminating apparatus having the control circuit is adaptable to a wider range of acceptable AC input.

In one aspect, the present invention provides a control circuit, comprising a first switch, a second switch, a freewheeling switch, and a switch controller, for auto-configuring two extrinsic LED arrays either in parallel or in series according to the AC input voltage range. The first switch is coupled between ground and the cathode of a first extrinsic LED array. The second switch is coupled between an extrinsic voltage source and the anode of a second extrinsic LED array. The freewheeling switch has a channel lying between the cathode of the first extrinsic LED array and the anode of the second extrinsic LED array. The switch controller is coupled to the output terminal of a voltage divider for sampling the peak voltage of the extrinsic voltage source and comparing the sampled peak voltage with an intrinsic reference or threshold voltage. When the extrinsic voltage source comes within a low range, the switch controller turns on the first and the second switch at the same time and the freewheeling switch is off so that the first and the second extrinsic LED array are lit up in parallel. When the extrinsic voltage source comes within a high range, the switch controller turns off the first and the second switch at the same time and the freewheeling switch is on so that the first and the second extrinsic LED array are lit up in series.

In another aspect, the present invention provides an integrated circuit having a substrate on which the aforementioned control circuit is integrated.

In still another aspect, the present invention provides an illuminating apparatus, comprising the aforementioned control circuit, at least one rectifier coupled to the extrinsic voltage source, as well as a first and a second extrinsic LED array under the control of the control circuit, wherein the first and the second extrinsic LED array each comprises a plurality of LED sub-arrays.

BRIEF DESCRIPTION OF THE DRAWINGS

The foregoing conceptions and their accompanying advantages of the present invention will get more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and not intended to limit the scope of the present invention.

Figure 1A:
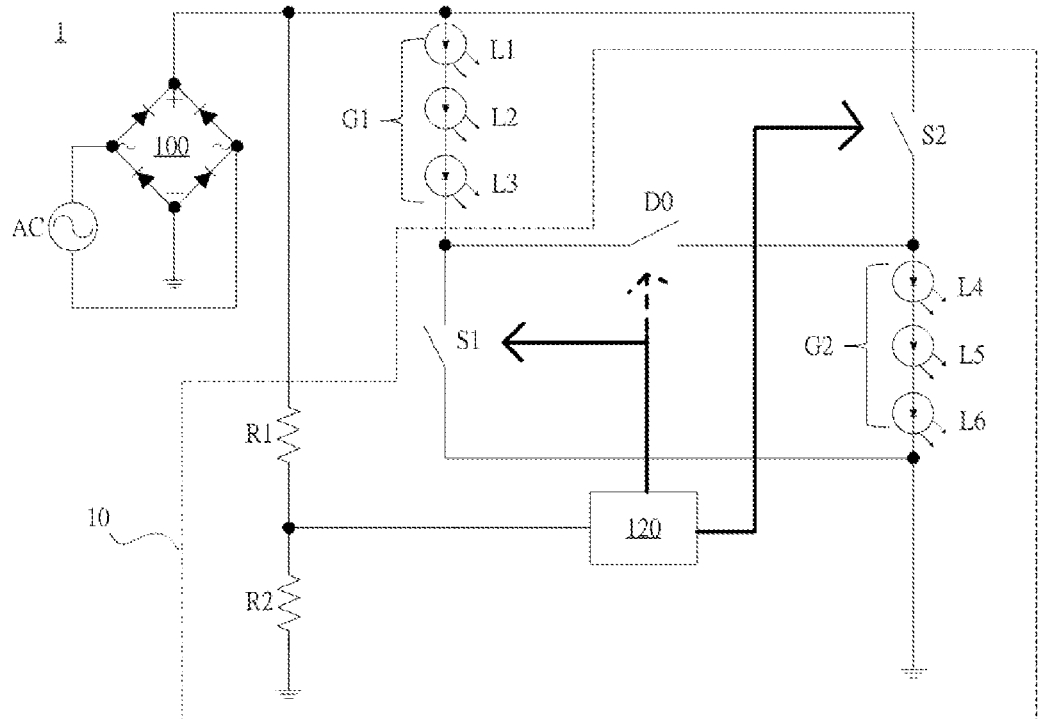
FIG. 1A illustrates a block diagram of an illuminating apparatus having the control circuit according to an embodiment of the present invention.

FIG. 1A illustrates a block diagram of an illuminating apparatus powered by a single AC voltage source and having a control circuit according to the embodiment of the present invention. The illuminating apparatus 1 comprises a single AC voltage source, a rectifier 100, a first extrinsic LED array G1 (comprising sub-arrays L1, L2, and L3), a second extrinsic LED array G2 (comprising LED sub-arrays L4, L5, and L6), and a control circuit 10 used for auto-configuring the two extrinsic LED arrays. The control circuit 10 comprises a voltage divider (resistors R1 and R2), a first switch S1, a second switch S2, a freewheeling switch D0, and a switch controller 120. The first extrinsic LED array G1 and the second extrinsic LED array G2 each comprise an LED array in any form. Besides, each of the two extrinsic LED arrays has at least one proper intrinsic current-limiting resistor, or is coupled to a current regulator to protect them from being damaged by excessive current flow. On top of that, the first switch S1 and the second switch S2 can be implemented with the adoption of Bipolar Junction Transistor (BJT), Junction Field Effect Transistor (JFET), or Metal Oxide Semiconductor Field Effect Transistor (MOSFET). The freewheeling switch D0 can be a diode or a transistor. If a diode is chosen as the freewheeling switch D0, the on or off state of the diode is determined by the forward or reverse bias across the diode. If a transistor is chosen as the freewheeling switch D0, the on or off state of the transistor is determined by the control signal from the switch controller 120. It is necessary that the on or off state of the first switch S1 be in sync with that of the second switch S2 but out of sync with that of the freewheeling switch D0. In other words, when the first switch S1 and the second switch S2 are both on, the freewheeling switch D0 must be off, and vice versa.

The first switch S1 is coupled between the cathode of the first extrinsic LED array G1 and ground. The second switch S2 is coupled between the anode of the second extrinsic LED array G2 and the high-side DC output terminal of the rectifier 100. The rectifier 100 provides a rectified sinusoidal voltage source. The freewheeling switch D0, which could be a diode or a transistor, has a channel lying between the cathode of the first extrinsic LED array G1 and the anode of the second extrinsic LED array G2. The switch controller 120 has its input terminal coupled to the output terminal of the voltage divider (resistors R1 and R2), its first output terminal represented in the form of a solid arrow and coupled to the control terminal of the first switch S1, its second output terminal represented in the form of another solid arrow and coupled to the control terminal of the second switch S2, and its third optional output terminal represented in the form of a dashed arrow and coupled to the control terminal of the freewheeling switch D0 implemented with the selection of a transistor.

When the AC voltage source comes within a low range, such as 100±20% V, the first switch S1 and the second switch S2 are turned on by the switch controller 120 simultaneously. Thus, both the first extrinsic LED array G1 and the second extrinsic LED array G2 connect between rectified sinusoidal voltage source and ground. Besides, the freewheeling switch D0 is off. So, the first extrinsic LED array G1 and the second extrinsic LED array G2 are lit up in parallel.

When the AC voltage source comes within a high range, such as 200±20% V, the first switch S1 and the second switch S2 are turned off by the switch controller 120 simultaneously. Besides, the freewheeling switch D0 is on. Thus, the first extrinsic LED array G1 and the second extrinsic LED array G2 are lit up in series. The amplitude and range of the high range (200±20% V) are twice as high and wide as those of the low range (100±20% V).

Figure 1B:
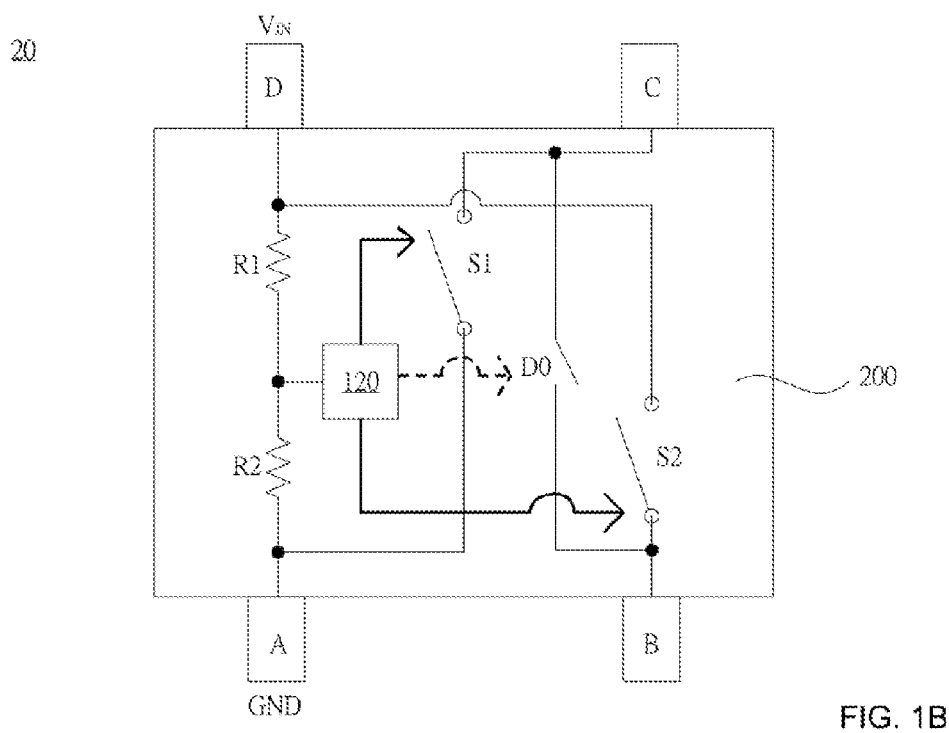
FIG. 1B illustrates a diagram showing an integrated circuit having the control circuit according to an embodiment of the present invention.

FIG. 1B illustrates an integrated circuit having a control circuit according to an embodiment of the present invention. The integrated circuit 20 has four pins A, B, C, and D as well as a substrate 200 on which the control circuit 10, as shown in FIG. 1A, is placed. The integrated circuit 20 has its pin A coupled to the low-side terminal of the resistor R2 and the low-side terminal of the first switch S1, its pin B coupled to the low-side terminal of the freewheeling switch D0 and the low-side terminal of the second switch S2, its pin C coupled to the high-side terminal of the first switch S1 and the high-side terminal of the freewheeling switch D0, and its pin D coupled to the high-side terminal of the resistor R1 and the high-side terminal of the second switch S2.

In FIG. 1B, resistors R1 and R2 are both placed on the substrate 200. In other embodiments, resistor R1 or R2 can also be placed outside the integrated circuit 20 to make the low and the high range programmable to circuit designers. Pins D and C respectively connect to the anode and the cathode of the first extrinsic LED array G1. Pins B and A respectively connect to the anode and the cathode of the second extrinsic LED array G2.

Figure 1C:
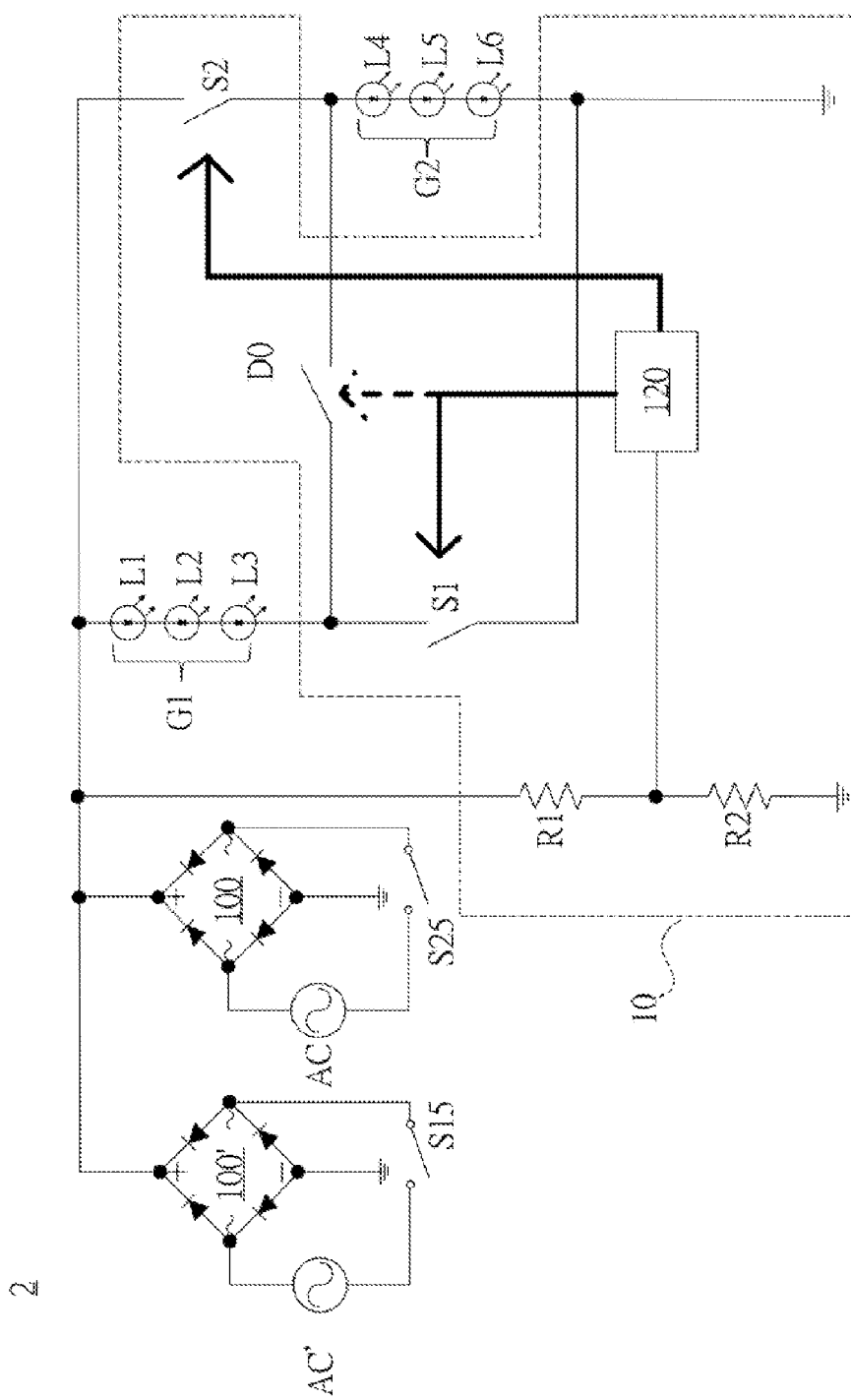
FIG. 1C illustrates a block diagram of another illuminating apparatus having the control circuit according to another embodiment of the present invention.

FIG. 1C illustrates a block diagram of an illuminating apparatus powered by a dual AC voltage source and having a control circuit according to another embodiment of the present invention. In the present embodiment, the first voltage source AC', coupled to the rectifier 100' through the switch S15, provides a low-range AC voltage such as 100±20% V while the second voltage source AC, coupled to the rectifier 100 through the switch S25, provides a high-range AC voltage such as 200±20% V.

When the switches S15 and S25 are both off, the control circuit 10 is out of operation without the voltage source. The first extrinsic LED array G1 and the second extrinsic LED array G2 are both off. When the switch S15 is on and S25 is off, the voltage source comes within the low range, the first switch S1 and the second switch S2 are both turned on under the control of the switch controller 120. The freewheeling switch D0 is off, so the first extrinsic LED array G1 (comprising LED sub-arrays L1, L2, and L3) and the second extrinsic LED array G2 (comprising LED sub-arrays L4, L5, and L6) are lit up in parallel. When the switch S15 is off and S25 is on, the voltage source comes within the high range, the first switch S1 and the second switch S2 are both turned off under the control of the switch controller 120. The freewheeling switch D0 is on, so the first extrinsic LED array G1 and the second extrinsic LED array G2 are lit up in series.

When the switches S15 and S25 are both on, the rectifier 100' coupled to the low-range voltage source AC' through the closed switch S15 is relatively reverse biased to disallow conduction while the rectifier 100 coupled to the high-range voltage source AC through the closed switch S25 is relatively forward biased to allow conduction, so the voltage source turns out to be within the high range. The first switch S1 and the second switch S2 are both turned off under the control of the switch controller 120. The freewheeling switch D0 is on, so the first extrinsic LED array G1 and the second extrinsic LED array G2 are lit up in series.

FIGS. 2~4 and FIGS. 6~8 illustrate a variety of preferred embodiments of the illuminating apparatus according to the present invention. The main difference between these preferred embodiments lies in the implementation pattern of the control circuit 10, as shown in FIG. 1A. That is to say, those skilled in the art might mix and match the various implementation patterns of the first switch S1, the second switch S2, the freewheeling switch D0, and the switch controller 120 within the spirit and scope of the present invention. More specifically, each of the first switch S1, the second switch S2, the freewheeling switch D0, and the switch controller 120 could be picked up and pieced together at random from any one of their preferred embodiments, shown in FIGS. 2~4 and FIG. 6 as examples rather than limitations.

Figure 2:
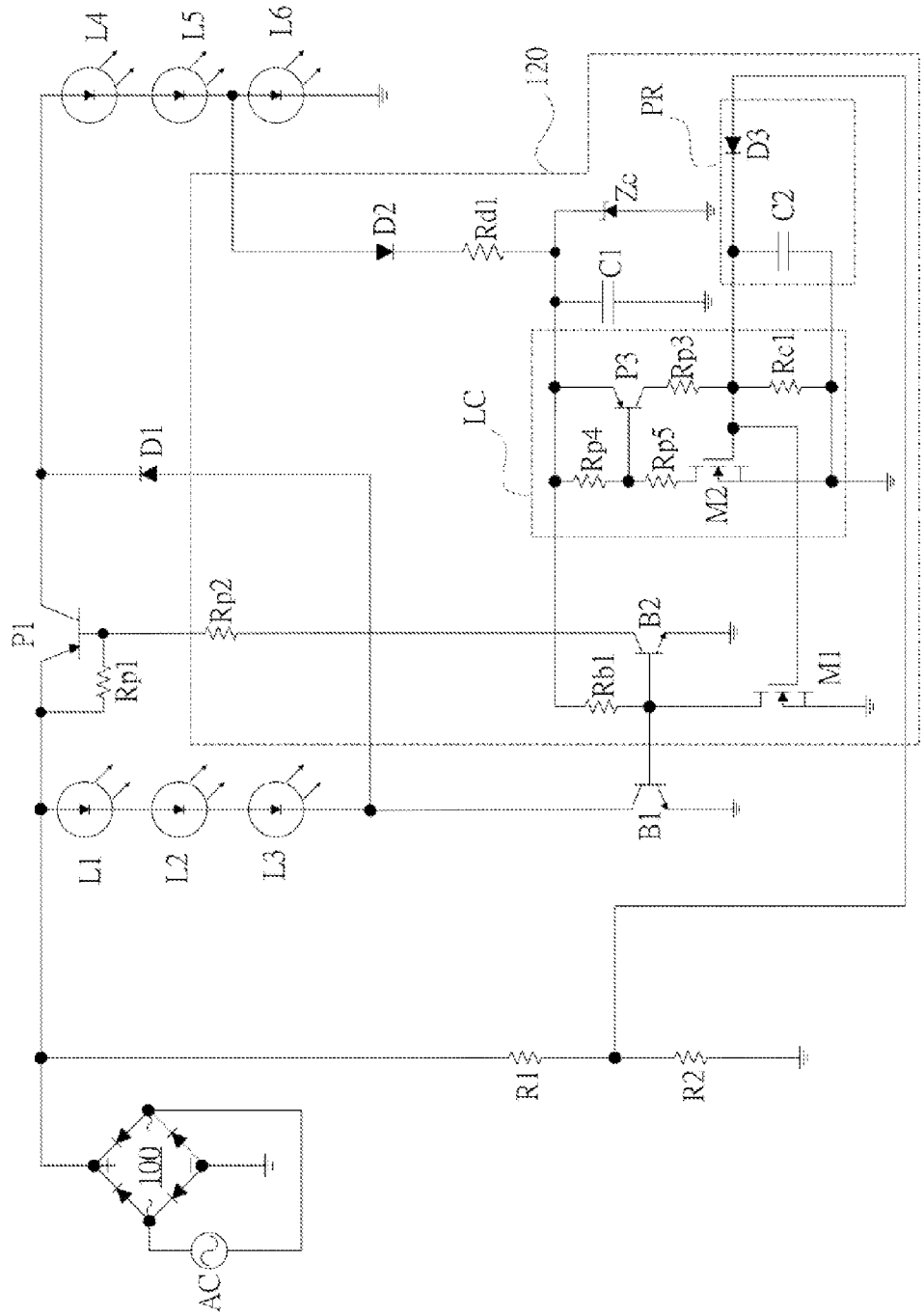
FIG. 2 illustrates a schematic diagram of an illuminating apparatus having the control circuit according to an embodiment of the present invention.

Please refer to FIG. 2, where the first switch B1 is an npn BJT, the second switch P1 is a pnp BJT, and the freewheeling switch D1 is a diode. The first switch B1 has its base coupled to the first output terminal of the switch controller 120, its emitter coupled to ground, and its collector coupled to the cathode of the first extrinsic LED array and the anode of the freewheeling switch D1. The second switch P1 has its base coupled to the low-side terminal of the resistor Rp1 and the high-side terminal of the resistor Rp2 (i.e., the second output terminal of the switch controller 120), its emitter coupled to the anode of the first extrinsic LED array, the high-side terminal of the resistor Rp1, and the high-side DC output terminal of the rectifier 100, and its collector coupled to the anode of the second extrinsic LED array and the cathode of the freewheeling switch D1.

The switch controller 120 comprises a peak rectifier PR (comprising a diode D3 and a capacitor C2), an interlock circuit LC (comprising an interlocking BJT P3, a resistor Rp3, a resistor Rp4, a resistor Rp5, a resistor Rc1, and an interlocking NMOS M2), a current-limiting resistor Rd1, a resistor Rb1, a resistor Rp2, a diode D2, a capacitor C1, an npn BJT B2, an NMOS M1, and a Zener diode Zc.

The switch controller 120 has its first input terminal (the anode of the diode D3) coupled to the output terminal of the voltage divider (resistors R1 and R2), its second input terminal (the anode of the diode D2) coupled to the anode of the LED sub-array L6, its first output terminal (the base of the BJT B2, the drain of the NMOS M1, and the low-side terminal of the resistor Rb1) coupled to the base of the first switch B1, and its second output terminal (the high-side terminal of the resistor Rp2) coupled to the base of the second switch P1 and the low-side terminal of the resistor Rp1.

In the present embodiment, the diode D2 has its anode coupled to the anode of the LED sub-array L6 and its cathode coupled to the high-side terminal of the current-limiting resistor Rd1. Swapping the diode D2 and the current-limiting resistor Rd1 is also feasible. The capacitor C1, connected in parallel with the Zener diode Zc, is coupled between the current-limiting resistor Rd1 and ground. As a matter of fact, the LED sub-array L6 made up of one or more LEDs with an adequate forward voltage drop could serve as a DC voltage source so that the capacitor C1 could get charged up to the breakdown voltage $V_Z$ of the Zener diode Zc through the diode D2 and the current-limiting resistor Rd1 whenever the LED sub-array L6 is lit up to show its forward voltage drop.

The voltage divider (resistors R1 and R2) is used for sampling the rectified sinusoidal voltage source and the peak rectifier PR is used for holding a sampled peak voltage serving as a signal input to the interlock circuit LC. The interlock circuit LC comprises the interlocking BJT P3 and the interlocking NMOS M2. The interlocking BJT P3 has its base coupled to the low-side terminal of the resistor Rp4 and the high-side terminal of the resistor Rp5, its emitter coupled to the high-side terminal of the capacitor C1, the cathode of the Zener diode Zc, the low-side terminal of the resistor Rd1, the high-side terminal of the resistor Rp4, and the high-side terminal of the resistor Rb1, and its collector coupled to the high-side terminal of the resistor Rp3. The interlocking NMOS M2 has its gate coupled to the high-side terminal of the resistor Rc1, the high-side terminal of the capacitor C2, the low-side terminal of the resistor Rp3, and the cathode of the diode D3, its source coupled to the low-side terminal of the resistor Rc1 and the low-side terminal of the capacitor C2, and its drain coupled to the low-side terminal of the resistor Rp5. The interlock circuit LC in conjunction with the peak rectifier PR controls the on or off state of the first switch B1, the second switch P1, and the freewheeling switch D1.

The sampled peak voltage held across the capacitor C2 in the peak rectifier PR is compared with the threshold voltage $V_{th,M2}$ of the interlocking NMOS M2 for determining the operation mode of the interlock circuit LC. If the sampled peak voltage is lower than the threshold voltage $V_{th,M2}$, the interlocking NMOS M2 wouldn't get turned on to forward bias the emitter-base junction of the interlocking BJT P3 through the resistor Rp5, so the interlocking BJT P3 gets turned off. The turn-off of the interlocking BJT P3 wouldn't inject a boost voltage $$V_C \times \frac{Rc1}{Rp3 + Rc1},$$

higher than the threshold voltage $V_{th,M2}$ by design, into the high-side terminal of the capacitor C2 and thus the interlocking NMOS M2 remains off. Such a latch-in-parallel mode takes place when the voltage source comes within the low range.

Conversely, if the sampled peak voltage is higher than the threshold voltage $V_{th,M2}$, the interlocking NMOS M2 would get turned on to forward bias the emitter-base junction of the interlocking BJT P3 through the resistor Rp5, so the interlocking BJT P3 gets turned on. The turn-on of the interlocking BJT P3 would inject a boost voltage $$V_C \times \frac{Rc1}{Rp3 + Rc1},$$

higher than the threshold voltage $V_{th,M2}$ by design, into the high-side terminal of the capacitor C2 and thus the interlocking NMOS M2 remains on. Such a latch-in-series mode takes place when the voltage source comes within the high range.

More specifically, when the voltage source comes within the low range, such as 100±20% V, even the upper limit of the sampled peak voltage, $$120\sqrt{2} \, \frac{R1}{R1 + R2},$$

is kept below the threshold voltage $V_{th,M2}$ of the interlocking NMOS M2 by design, leading to the aforementioned latch-in-parallel mode within the low range. In this latch-in-parallel mode, the first switch B1 and the npn BJT B2 are both turned on. The turn-on of the BJT B2 would, in turn, turn on the second switch P1 by forward biasing the emitter-base junction of the second switch P1. With the turn-on of the first switch B1 and the second switch P1 at the same time, the freewheeling switch D1 is reverse biased to turn off. The first extrinsic LED array (comprising LED sub-arrays L1, L2, and L3) and the second extrinsic LED array (comprising LED sub-arrays L4, L5, and L6) are lit up in parallel within the low range.

Conversely, when the voltage source comes within the high range, such as 200±20% V, even the lower limit of the sampled peak voltage, $$160\sqrt{2}\,\frac{R1}{R1+R2},$$

is kept above the threshold voltage $V_{th,M2}$ of the interlocking NMOS M2 by design, leading to the aforementioned latch-in-series mode within the high range. In this latch-in-series mode, the first switch B1 and the npn BJT B2 are both turned off. The turn-off of the BJT B2 would, in turn, turn off the second switch P1 by not forward biasing the emitter-base junction of the second switch P1. With the turn-off of the first switch B1 and the second switch P1 at the same time, the freewheeling switch D1 is forward biased to turn on. The first extrinsic LED array (comprising LED sub-arrays L1, L2, and L3) and the second extrinsic LED array (comprising LED sub-arrays L4, L5, and L6) are lit up in series within the high range.

Figure 3:
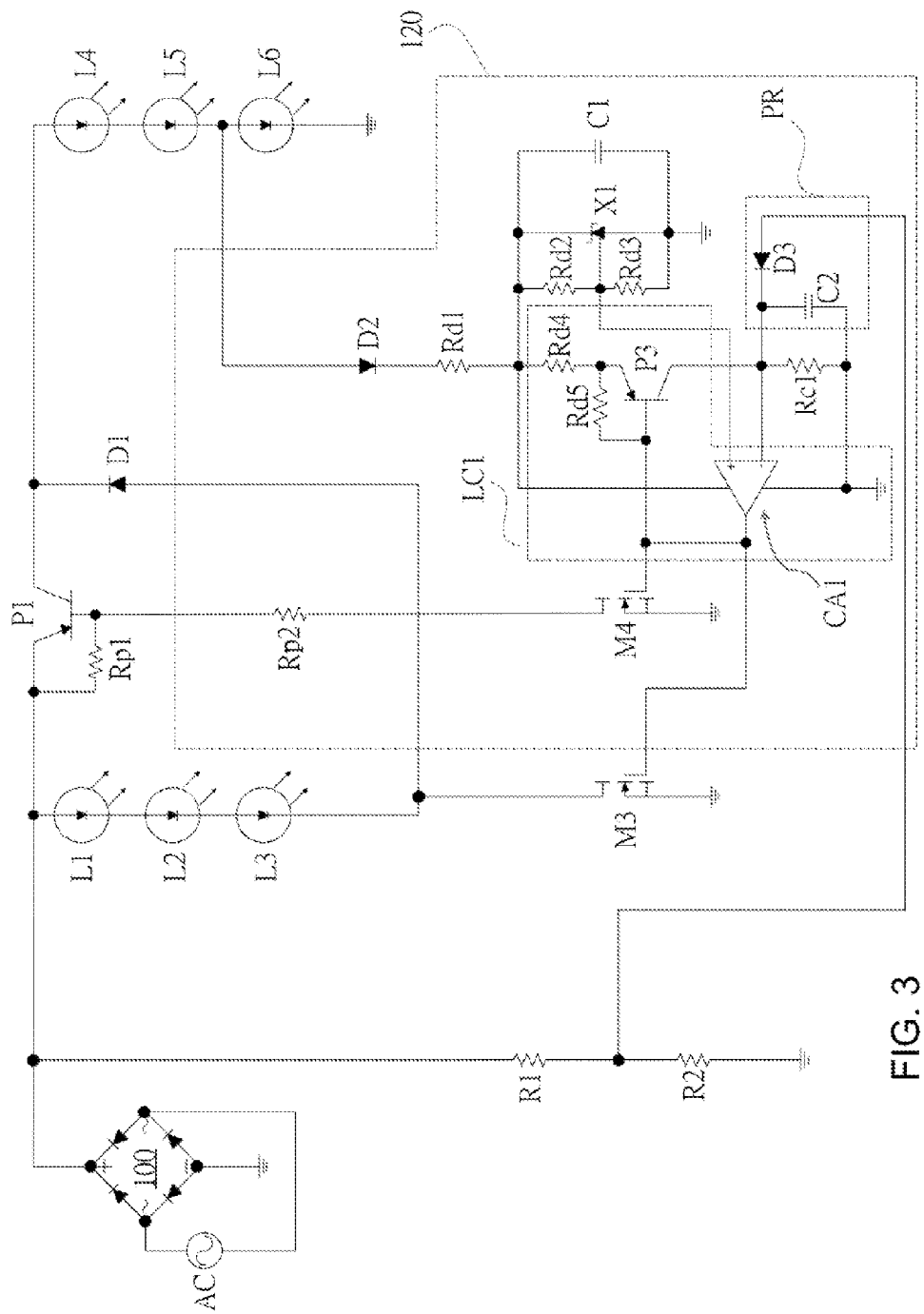
FIG. 3 illustrates a schematic diagram of an illuminating apparatus having the control circuit according to another embodiment of the present invention.

Please refer to FIG. 3, where the first switch M3 is an enhancement mode NMOS, the second switch P1 is a pnp type BJT, and the freewheeling switch D1 is a diode. The first switch M3 has its gate coupled to the first output terminal of the switch controller 120, its source coupled to ground, and its drain coupled to the cathode of the first extrinsic LED array and the anode of the freewheeling switch D1. The second switch P1 has its emitter coupled to the high-side DC output terminal of the rectifier 100, the high-side terminal of the resistor R1, the anode of the first extrinsic LED array, and the high-side terminal of the resistor Rp1, its base coupled to the low-side terminal of the resistor Rp1 and the second output terminal of the switch controller 120, and its collector coupled to the cathode of the freewheeling switch D1 and the anode of the second extrinsic LED array.

The switch controller 120 comprises a peak rectifier PR (comprising a diode D3 and a capacitor C2), an interlock circuit LC1 (comprising an interlocking BJT P3, a resistor Rd4, a resistor Rd5, a resistor Rc1, and a comparator CA1), a resistor Rp2, a current-limiting resistor Rd1, a voltage divider (resistors Rd2 and Rd3), a MOSFET M4, a diode D2, a capacitor C1, and a shunt regulator X1. The switch controller 120 has its first input terminal (the anode of the diode D3) coupled to the output terminal of the voltage divider (resistors R1 and R2), its second input terminal (the anode of the diode D2) coupled to the anode of the LED sub-array L6, its first output terminal (the output terminal of the comparator CA1, the base of the BJT P3, and the low-side terminal of the resistor Rd5) coupled to the gate of the first switch M3 and the gate of the NMOS M4, and its second output terminal (the high-side terminal of the resistor Rp2) coupled to the low-side terminal of the resistor Rp1 and the base of the second switch P1.

In the present embodiment, the diode D2 has its anode coupled to the anode of the LED sub-array L6 and its cathode coupled to the high-side terminal of the current-limiting resistor Rd1. Swapping the diode D2 and the current-limiting resistor Rd1 is also feasible. The capacitor C1, connected in parallel with the shunt regulator X1, is coupled between the current-limiting resistor Rd1 and ground. As a matter of fact, the LED sub-array L6 made up of one or more LEDs with an adequate forward voltage drop could serve as a DC voltage source so that the capacitor C1 could get charged up to a preset voltage level $$\left(1+\frac{Rd2}{Rd3}\right)\times Vref$$

regulated by the shunt regulator X1 through the diode D2 and the current-limiting resistor Rd1 whenever the LED sub-array L6 is lit up to show its forward voltage drop.

The voltage divider (resistors R1 and R2) is used for sampling the rectified sinusoidal voltage source and the peak rectifier PR is used for holding a sampled peak voltage serving as a signal input to the interlock circuit LC1. The interlock circuit LC1 comprises the comparator CA1 and the interlocking BJT P3. The comparator CA1 has its non-inverting input terminal coupled to the reference terminal of the shunt regulator X1 and fed with a reference voltage (for example, 2.5V) for comparison, its inverting input terminal coupled to the high-side terminal of the capacitor C2 and fed with the sampled peak voltage for comparison, and its output terminal coupled to the base of the interlocking BJT P3, the gate of the first switch M3, and the base of the second switch P1 through the NMOS M4 and the resistor Rp2 to control the on or off state of the first and the second switch.

The sampled peak voltage received by the inverting input terminal of the comparator CA1 is compared with the reference voltage received by the non-inverting input terminal of the comparator CA1. If the sampled peak voltage is lower than the reference voltage, the output terminal potential of the comparator CA1 would go up to the terminal voltage Vc of the capacitor C1 to turn off the interlocking BJT P3 by not forward biasing its emitter-base junction. The turn-off of the interlocking BJT P3 wouldn't inject a boost voltage $$V_C\times\frac{Rc1}{Rd4+Rc1},$$

higher than the reference voltage by design, into the high-side terminal of the capacitor C2 and thus the interlocking BJT P3 remains off. Such a latch-in-parallel mode takes place when the voltage source comes within the low range.

Conversely, if the sampled peak voltage is higher than the reference voltage, the output terminal potential of the comparator CA1 would go down to ground level to turn on the interlocking BJT P3 by forward biasing its emitter-base junction. The turn-on of the interlocking BJT P3 would inject a boost voltage $$V_C\times\frac{Rc1}{Rd4+Rc1},$$

higher than the reference voltage by design, into the high-side terminal of the capacitor C2 and thus the interlocking BJT P3 remains on. Such a latch-in-series mode takes place when the voltage source comes within the high range.

More specifically, when the voltage source comes within the low range, such as 100±20% V, even the upper limit of the sampled peak voltage, $$120\sqrt{2}\,\frac{R1}{R1+R2},$$

is kept below the reference voltage of the shunt regulator X1 by design, leading to the aforementioned latch-in-parallel mode within the low range. In this latch-in-parallel mode, the first switch M3 and the NMOS M4 are both turned on. The turn-on of the NMOS M4 would, in turn, turn on the second switch P1 by forward biasing its emitter-base junction through the resistor Rp2. With the turn-on of the first switch M3 and the second switch P1 at the same time, the freewheeling switch D1 is reverse biased to turn off. The first extrinsic LED array (comprising LED sub-arrays L1, L2, and L3) and the second extrinsic LED array (comprising LED sub-arrays L4, L5, and L6) are lit up in parallel within the low range.

Conversely, when the voltage source comes within the high range, such as 200±20% V, even the lower limit of the sampled peak voltage, $$160\sqrt{2}\,\frac{R1}{R1+R2},$$

is kept above the reference voltage of the shunt regulator X1 by design, leading to the aforementioned latch-in-series mode within the high range. In this latch-in-series mode, the first switch M3 and the NMOS M4 are both turned off. The turn-off of the NMOS M4 would, in turn, turn off the second switch P1 by not forward biasing its emitter-base junction through the resistor Rp2. With the turn-off of the first switch M3 and the second switch P1 at the same time, the freewheeling switch D1 is forward biased to turn on. The first extrinsic LED array (comprising LED sub-arrays L1, L2, and L3) and the second extrinsic LED array (comprising LED sub-arrays L4, L5, and L6) are lit up in series within the high range.

Figure 4:
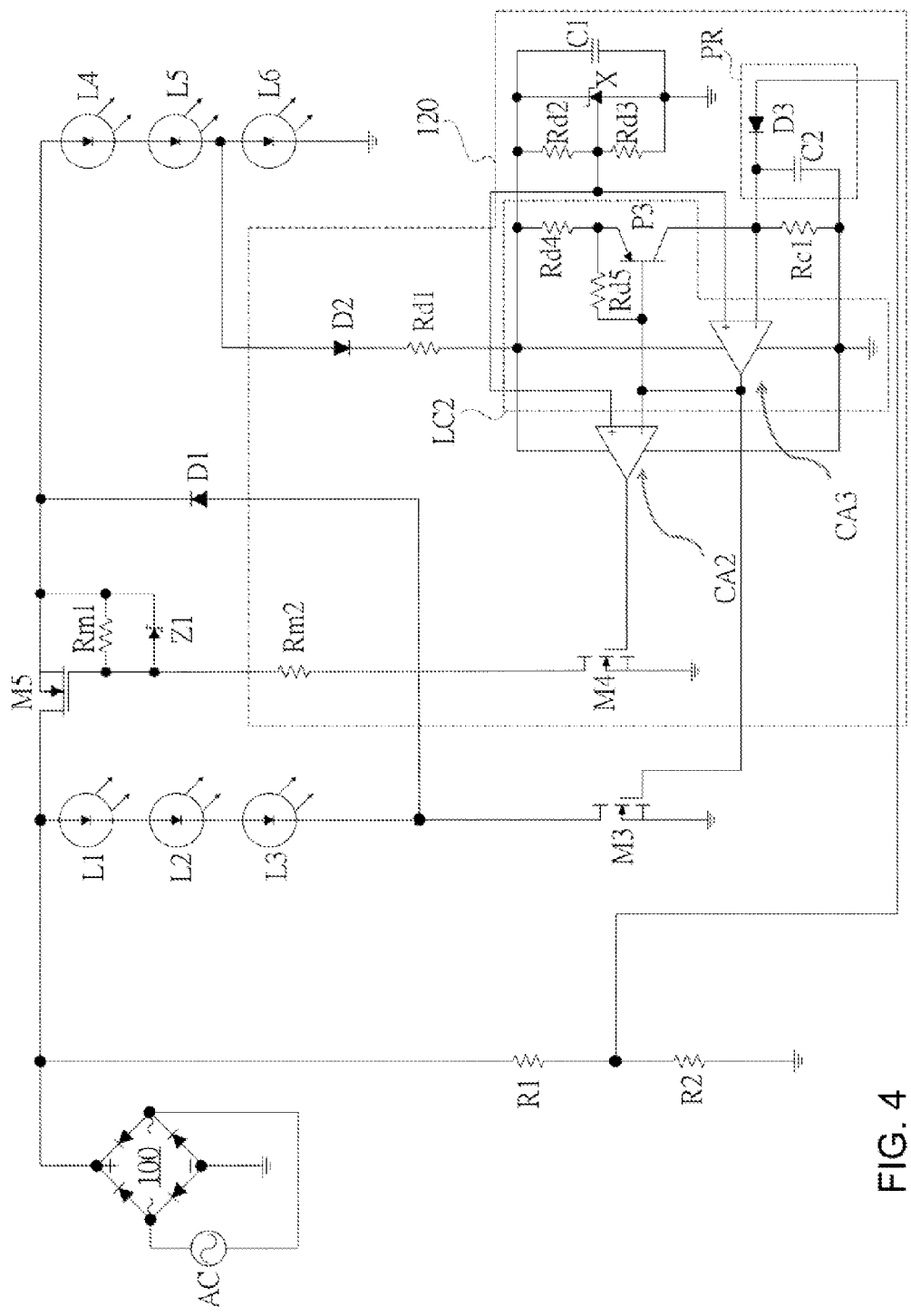
FIG. 4 illustrates a schematic diagram of an illuminating apparatus having the control circuit according to another embodiment of the present invention.

Please refer to FIG. 4, where the first switch M3 is an enhancement mode NMOS, the second switch M5 is a depletion mode NMOS, and the freewheeling switch D1 is a diode. The first switch M3 has its gate coupled to the first output terminal of the switch controller 120, its source coupled to ground, and its drain coupled to the cathode of the first extrinsic LED array and the anode of the freewheeling switch D1. The second switch M5 has its gate coupled to the low-side terminal of the resistor Rm1, the anode of the Zener diode Z1, and the second output terminal of the switch controller 120, its source coupled to the high-side terminal of the resistor Rm1, the cathode of the Zener diode Z1, the cathode of the freewheeling switch D1, and the anode of the second extrinsic LED array, and its drain coupled to the high-side DC output terminal of the rectifier 100, the high-side terminal of the resistor R1, and the anode of the first extrinsic LED array.

The switch controller 120 comprises a peak rectifier PR (comprising a diode D3 and a capacitor C2), an interlock circuit LC2 (comprising an interlocking BJT P3, a resistor Rd4, a resistor Rd5, and a comparator CA3), a current-limiting resistor Rd1, a voltage divider (resistors Rd2 and Rd3), a comparator CA2, a diode D2, a capacitor C1, and a shunt regulator X. The switch controller 120 has its first input terminal (the anode of the diode D3) coupled to the output terminal of the voltage divider (resistors R1 and R2), its second input terminal (the anode of the diode D2) coupled to the anode of the LED sub-array L6, its first output terminal (the output terminal of the comparator CA3, the base of the interlocking BJT P3, the low-side terminal of the resistor Rd5, and the inverting input terminal of the comparator CA2) coupled to the gate of the first switch M3, and its second output terminal (the high-side terminal of the resistor Rm2) coupled to the anode of the Zener diode Z1, the low-side terminal of the resistor Rm1, and the gate of the second switch M5.

In the present embodiment, the diode D2 has its anode coupled to the anode of the LED sub-array L6 and its cathode coupled to the high-side terminal of the current-limiting resistor Rd1. Swapping the diode D2 and the current-limiting resistor Rd1 is also feasible. The capacitor C1, connected in parallel with the shunt regulator X, is coupled between the current-limiting resistor Rd1 and ground. The structure of the LED sub-array L6 and the charging of the capacitor C1 can be identical or similar to those shown in FIG. 3.

The voltage divider (resistors R1 and R2) is used for sampling the rectified sinusoidal voltage source and the peak rectifier PR is used for holding a sampled peak voltage serving as a signal input to the interlock circuit LC2. The interlock circuit LC2 comprises the comparator CA3 and the interlocking BJT P3. The comparator CA3 has its non-inverting input terminal coupled to the reference terminal of the shunt regulator X and the non-inverting input terminal of the comparator CA2 as well as fed with a reference voltage (for example, 2.5V) for comparison, its inverting input terminal coupled to the high-side terminal of the capacitor C2 and fed with the sampled peak voltage for comparison, and its output terminal coupled to the base of the interlocking BJT P3, the gate of the first switch M3, the low-side terminal of the resistor Rd5, and the inverting input terminal of the comparator CA2 to control the on or off state of the first and the second switch.

The sampled peak voltage received by the inverting input terminal of the comparator CA3 is compared with the reference voltage received by the non-inverting input terminal of the comparator CA3. If the sampled peak voltage is lower than the reference voltage, the output terminal potential of the comparator CA3 would go up to the terminal voltage Vc to turn off the interlocking BJT P3 by not forward biasing its emitter-base junction. The turn-off of the interlocking BJT P3 wouldn't inject a boost voltage $$V_C \times \frac{Rc1}{Rd4+Rc1},$$

higher than the reference voltage by design, into the high-side terminal of the capacitor C2 and thus the interlocking BJT P3 remains off. Such a latch-in-parallel mode takes place when the voltage source comes within the low range.

Conversely, if the sampled peak voltage is higher than the reference voltage, the output terminal potential of the comparator CA3 would go down to ground level to turn on the interlocking BJT P3 by forward biasing its emitter-base junction. The turn-on of the interlocking BJT P3 would inject a boost voltage $$V_C \times \frac{Rc1}{Rd4+Rc1},$$

higher than the reference voltage by design, into the high-side terminal of the capacitor C2 and thus the interlocking BJT P3 remains on. Such a latch-in-series mode takes place when the voltage source comes within the high range.

More specifically, when the voltage source comes within the low range, such as 100±20% V, even the upper limit of the sampled peak voltage, $$120\sqrt{2}\,\frac{R1}{R1+R2},$$

is kept below the reference voltage of the shunt regulator X by design, leading to the aforementioned latch-in-parallel mode within the low range. In this latch-in-parallel mode, the first switch M3 is turned on and the NMOS M4 is turned off. The turn-off of the NMOS M4 would, in turn, turn on the second switch M5 by providing its gate and source with a zero voltage difference. With the turn-on of the first switch M3 and the second switch M5 at the same time, the freewheeling switch D1 is reverse biased to turn off. The first extrinsic LED array (comprising LED sub-arrays L1, L2, and L3) and the second extrinsic LED array (comprising LED sub-arrays L4, L5, and L6) are lit up in parallel within the low range.

Conversely, when the voltage source comes within the high range, such as 200±20% V, even the lower limit of the sampled peak voltage, $$160\sqrt{2}\,\frac{R1}{R1+R2},$$

is kept above the reference voltage of the shunt regulator X by design, leading to the aforementioned latch-in-series mode within the high range. In this latch-in-series mode, the first switch M3 is turned off and the NMOS M4 is turned on. The turn-on of the NMOS M4 would, in turn, turn off the second switch M5 by providing its gate and source with an adequate negative voltage difference. With the turn-off of the first switch M3 and the second switch M5 at the same time, the freewheeling switch D1 is forward biased to turn on. The first extrinsic LED array (comprising LED sub-arrays L1, L2, and L3) and the second extrinsic LED array (comprising LED sub-arrays L4, L5, and L6) are lit up in series within the high range.

Figure 5A:
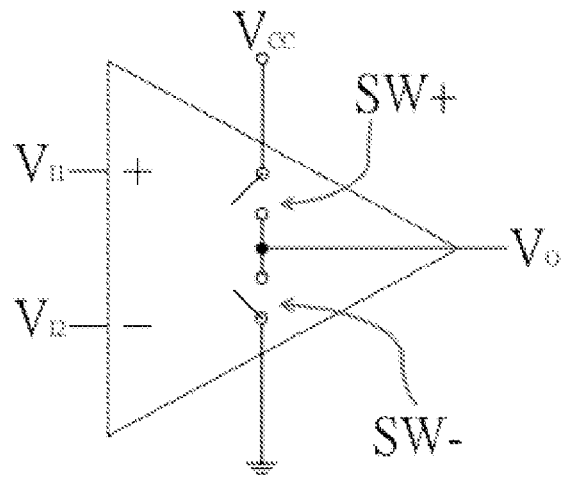
FIGS. 5(a), 5(b), and 5(c) illustrate schematic diagrams showing the applicable types of the comparators according to the embodiments of the present invention.
Figure 5B:
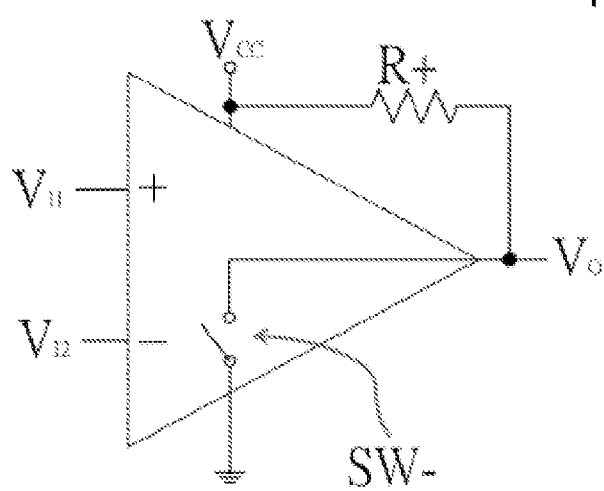
Figure 5C:
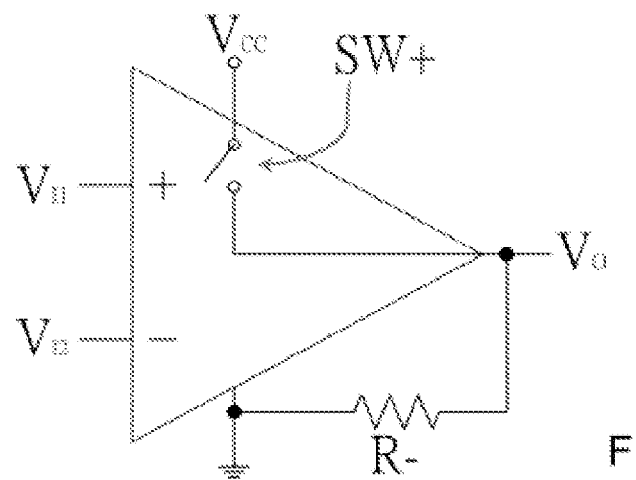

FIGS. 5(a), 5(b), and 5(c) illustrate various types of comparators applicable to FIGS. 3 and 4. All of the comparators have a total of five terminals in common: a non-inverting input terminal $V_{I1}$, an inverting input terminal $V_{I2}$, an output terminal $V_O$, a supply terminal $V_{CC}$, and a ground terminal. The difference between them lies in the presence or absence of an internal pull-up switch SW+ or an external pull-up resistor R+ between the supply terminal $V_{CC}$ and the output terminal $V_O$ as well as an internal pull-down switch SW− or an external pull-down resistor R− between the output terminal $V_O$ and the ground terminal. Each switch SW+ or SW− could be but wouldn't be limited to a MOSFET or a BJT.

FIG. 5(a) illustrates a first type comparator having a switch SW+ between its supply terminal $V_{CC}$ and its output terminal Vo as well as a switch SW− between its output terminal Vo and its ground terminal. Whenever the potential of the non-inverting input terminal $V_{I1}$ is higher than that of the inverting input terminal $V_{I2}$, the switch SW+ is closed and the switch SW− is open, so the potential of the comparator output terminal is pulled high through the switch SW+. Whenever the potential of the non-inverting input terminal $V_{I1}$ is lower than that of the inverting input potential $V_{I2}$, the switch SW+ is open and the switch SW− is closed, so the potential of the comparator output terminal is pulled low through the switch SW−.

FIG. 5(b) illustrates a second type comparator having a resistor R+ between its supply terminal $V_{CC}$ and its output terminal Vo as well as a switch SW− between its output terminal Vo and its ground terminal. Whenever the potential of the non-inverting input terminal $V_{I1}$ is higher than that of the inverting input potential $V_{I2}$, the switch SW− is open, so the potential of the comparator output terminal is pulled high through the resistor R+. Whenever the potential of the non-inverting input terminal $V_{I1}$ is lower than that of the inverting input potential $V_{I2}$, the switch SW− is closed, so the potential of the comparator output terminal is pulled low through the switch SW−.

FIG. 5(c) illustrates a third type comparator having a SW+ between its supply terminal $V_{CC}$ and its output terminal Vo as well as an R− between its output terminal Vo and its ground terminal. Whenever the potential of the non-inverting input terminal $V_{I1}$ is higher than that of the inverting input potential $V_{I2}$, the switch SW+ is closed, so the potential of the comparator output terminal is pulled high through the SW+. Whenever the potential of the non-inverting input terminal $V_{I1}$ is lower than that of the inverting input potential $V_{I2}$, the switch SW+ is open, so the potential of the comparator output terminal is pulled low through the R−.

Figure 6:
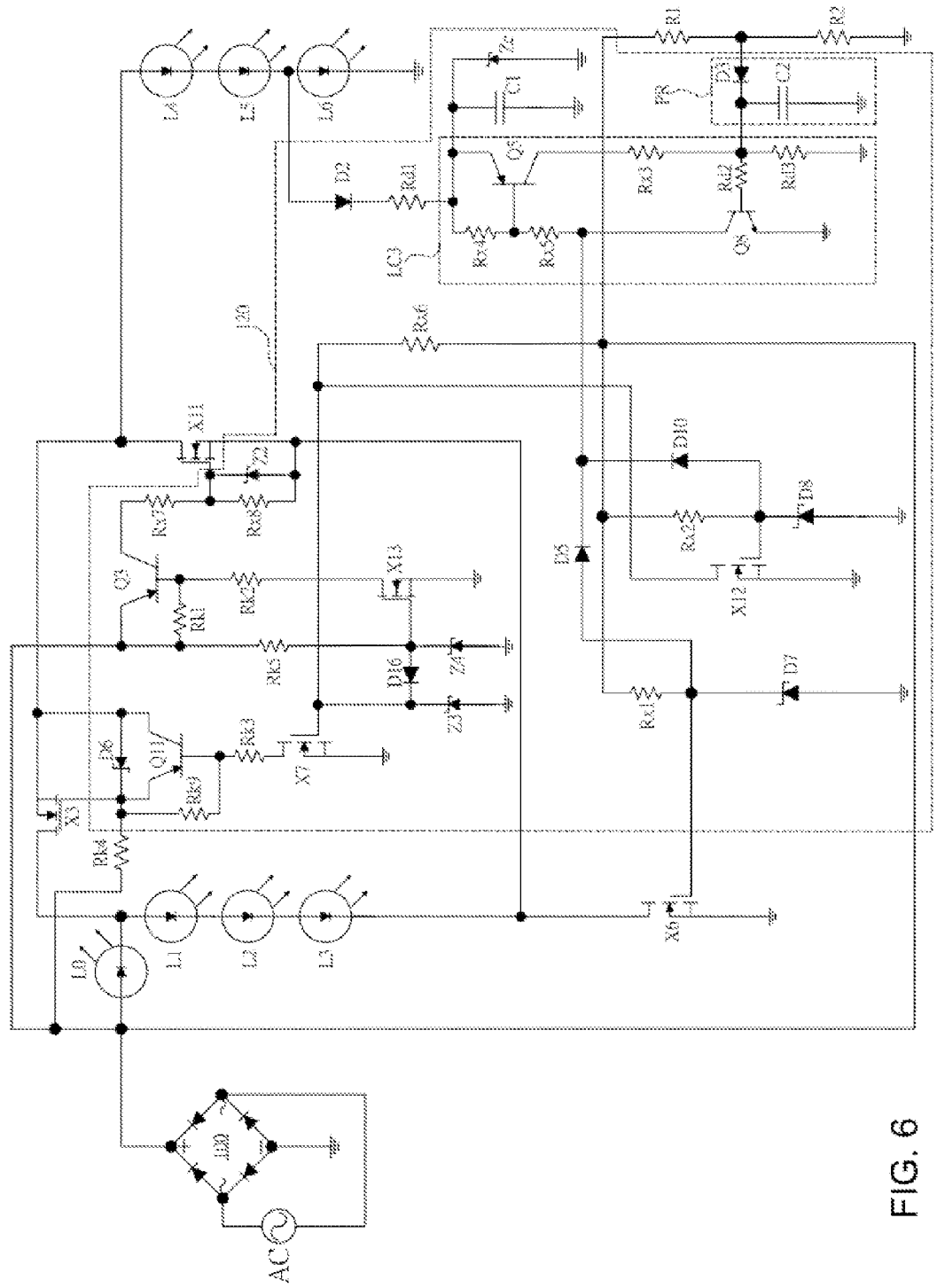
FIG. 6 illustrates a schematic diagram of an illuminating apparatus having the control circuit according to another embodiment of the present invention.

Please refer to FIG. 6, where the first switch X6 is an enhancement mode NMOS, the second switch X3 is an enhancement mode NMOS, and the freewheeling switch X11 is an enhancement mode NMOS. The first switch X6 has its gate coupled to the first output terminal of the switch controller 120, its source coupled to ground, and its drain coupled to the cathode of the first extrinsic LED array, the source of the freewheeling switch X11, the anode of the Zener diode Z2, and the low-side terminal of the resistor Rx8. The second switch X3 has its gate coupled to the low-side terminal of the resistor Rk4, the high-side terminal of the resistor Rk9, the cathode of the Zener diode D6, and the emitter of the BJT Q11 (i.e., the second output terminal of the switch controller 120), its source coupled to the drain of the freewheeling switch X11, the anode of the second extrinsic LED array, the collector of the BJT Q11, and the anode of the Zener diode D6, and its drain coupled to the cathode of the LED sub-array L0 and the anode of the first extrinsic LED array.

The switch controller 120 comprises a peak rectifier PR (comprising a diode D3 and a capacitor C2), an interlock circuit LC3 (comprising an interlocking BJT Q8, a resistor Rd2, a resistor Rd3, a resistor Rx3, a resistor Rx4, a resistor Rx5, and an interlocking BJT Q5), a current-limiting resistor Rd1, a resistor Rx1, a resistor Rx2, a resistor Rx6, a resistor Rx7, a resistor Rx8, a resistor Rk1, a resistor Rk2, a resistor Rk3, a resistor Rk4, a resistor Rk5, a resistor Rk9, a diode D2, a diode D5, a diode D10, a diode D16, a capacitor C1, a NMOS X7, a NMOS X12, a NMOS X13, a pnp BJT Q3, a pnp BJT Q11, a Zener diode D6, a Zener diode D7, a Zener diode D8, a Zener diode Z2, a Zener diode Z3, a Zener diode Z4, and a Zener diode Zc.

The switch controller 120 has its first input terminal (the anode of the diode D3) coupled to the output terminal of the voltage divider (resistors R1 and R2), its second input terminal (the anode of the diode D2) coupled to the anode of the LED sub-array L6, its first output terminal (the cathode of the Zener diode D7, the anode of the diode D5, and the low-side terminal of the resistor Rx1) coupled to the gate of the first switch X6, its second output terminal (the low-side terminal of the resistor Rk4, the cathode of the Zener diode D6, the emitter of the pnp BJT Q11, and the high-side terminal of the resistor Rk9) coupled to the gate of the second switch X3, and its third output terminal (the low-side terminal of the resistor Rx7, the cathode of the Zener diode Z2, and the high-side terminal of the resistor Rx8) coupled to the gate of the freewheeling switch X11.

In the present embodiment, the diode D2 has its anode coupled to the anode of the LED sub-array L6 and its cathode coupled to the high-side terminal of the current-limiting resistor Rd1. Swapping the diode D2 and the current-limiting resistor Rd1 is also feasible. The capacitor C1, connected in parallel with the Zener diode Zc, is coupled between the current-limiting resistor Rd1 and ground. As a matter of fact, the LED sub-array L6 made up of one or more LEDs with an adequate forward voltage drop could serve as a DC voltage source so that the capacitor C1 could get charged up to the breakdown voltage $V_Z$ of the Zener diode Zc through the diode D2 and the current-limiting resistor Rd1 whenever the LED sub-array L6 is lit up to show its forward voltage drop.

The voltage divider (resistors R1 and R2) is used for sampling the rectified sinusoidal voltage source and the peak rectifier PR is used for holding a sampled peak voltage serving as a signal input to the interlock circuit LC3. The interlock circuit LC3 comprises the interlocking BJT Q8 and the interlocking BJT Q5. The interlocking BJT Q8 has its base coupled to the low-side terminal of the resistor Rd2, its emitter coupled to ground, and its collector coupled to the low-side terminal of the resistor Rx5 as well as the cathodes of the diode D5 and the diode D10. The interlocking BJT Q5 has its emitter coupled to the high-side terminal of the capacitor C1, the cathode of the Zener diode Zc, the low-side terminal of the resistor Rd1, and the high-side terminal of the resistor Rx4, its base coupled to the low-side terminal of the resistor Rx4 and the high-side terminal of the resistor Rx5, and its collector coupled to the high-side terminal of the resistor Rx3. The resistor Rd2 is used as an anti-clamping resistor. The interlock circuit LC3 in conjunction with the peak rectifier PR controls the on or off state of the first switch X6, the second switch X3, and the freewheeling switch X11.

The sampled peak voltage held across the capacitor C2 in the peak rectifier PR is compared with the cut-in voltage of the interlocking BJT Q8 for determining the operation mode of the interlock circuit LC3. If the sampled peak voltage is lower than the cut-in voltage, the interlocking BJT Q8 wouldn't get turned on to forward bias the emitter-base junction of the interlocking BJT Q5 through the resistor Rx5, so the interlocking BJT Q5 gets turned off. The turn-off of the interlocking BJT Q5 wouldn't inject a boost voltage $$V_C \times \frac{Rd3}{Rx3 + Rd3},$$

higher than the cut-in voltage by design, into the high-side terminal of the capacitor C2 and thus the interlocking BJT Q5 remains off. Such a latch-in-parallel mode takes place when the voltage source comes within the low range.

Conversely, if the sampled peak voltage is higher than the cut-in voltage, the interlocking BJT Q8 would get turned on to forward bias the emitter-base junction of the interlocking BJT Q5 through the resistor Rx5, so the interlocking BJT Q5 gets turned on. The turn-on of the interlocking BJT Q5 would inject a boost voltage $$V_C \times \frac{Rd3}{Rx3 + Rd3},$$

higher than the cut-in voltage by design, into the high-side terminal of the capacitor C2 and thus the interlocking BJT Q5 remains on. Such a latch-in-series mode takes place when the voltage source comes within the high range.

More specifically, when the voltage source comes within the low range, such as 100±20% V, even the upper limit of the sampled peak voltage, $$120\sqrt{2}\,\frac{R1}{R1+R2},$$

is kept below the cut-in voltage of the interlocking BJT Q8 by design, leading to the aforementioned latch-in-parallel mode within the low range. In this latch-in-parallel mode, the first switch X6 and the NMOS X12 are both turned on. The turn-on of the NMOS X12 would, in turn, turn on the second switch X3 by pulling low the gate potential of the NMOS X7 and not forward biasing the emitter-base junction of the BJT Q11. With the turn-on of the first switch X6 and the second switch X3 at the same time, the freewheeling switch X11 gets turned off due to the turn-off of the BJT Q3 to discharge its intrinsic gate-source capacitor. The first extrinsic LED array (comprising LED sub-arrays L1, L2, and L3) and the second extrinsic LED array (comprising LED sub-arrays L4, L5, and L6) are lit up in parallel within the low range.

Conversely, when the voltage source comes within the high range, such as 200±20% V, even the lower limit of the sampled peak voltage, $$160\sqrt{2}\,\frac{R1}{R1+R2},$$

is kept above the cut-in voltage of the interlocking BJT Q8 by design, leading to the aforementioned latch-in-series mode within the high range. In this latch-in-series mode, the first switch X6 and the NMOS X12 are both turned off. The turn-off of the NMOS X12 would, in turn, turn off the second switch X3 by not pulling low the gate potential of the NMOS X7 and forward biasing the emitter-base junction of the BJT Q11. With the turn-off of the first switch X6 and the second switch X3 at the same time, the freewheeling switch X11 gets turned on due to the turn-on of the BJT Q3 to charge its intrinsic gate-source capacitor. The first extrinsic LED array (comprising LED sub-arrays L1, L2, and L3) and the second extrinsic LED array (comprising LED sub-arrays L4, L5, and L6) are lit up in series within the high range.

Figure 7:
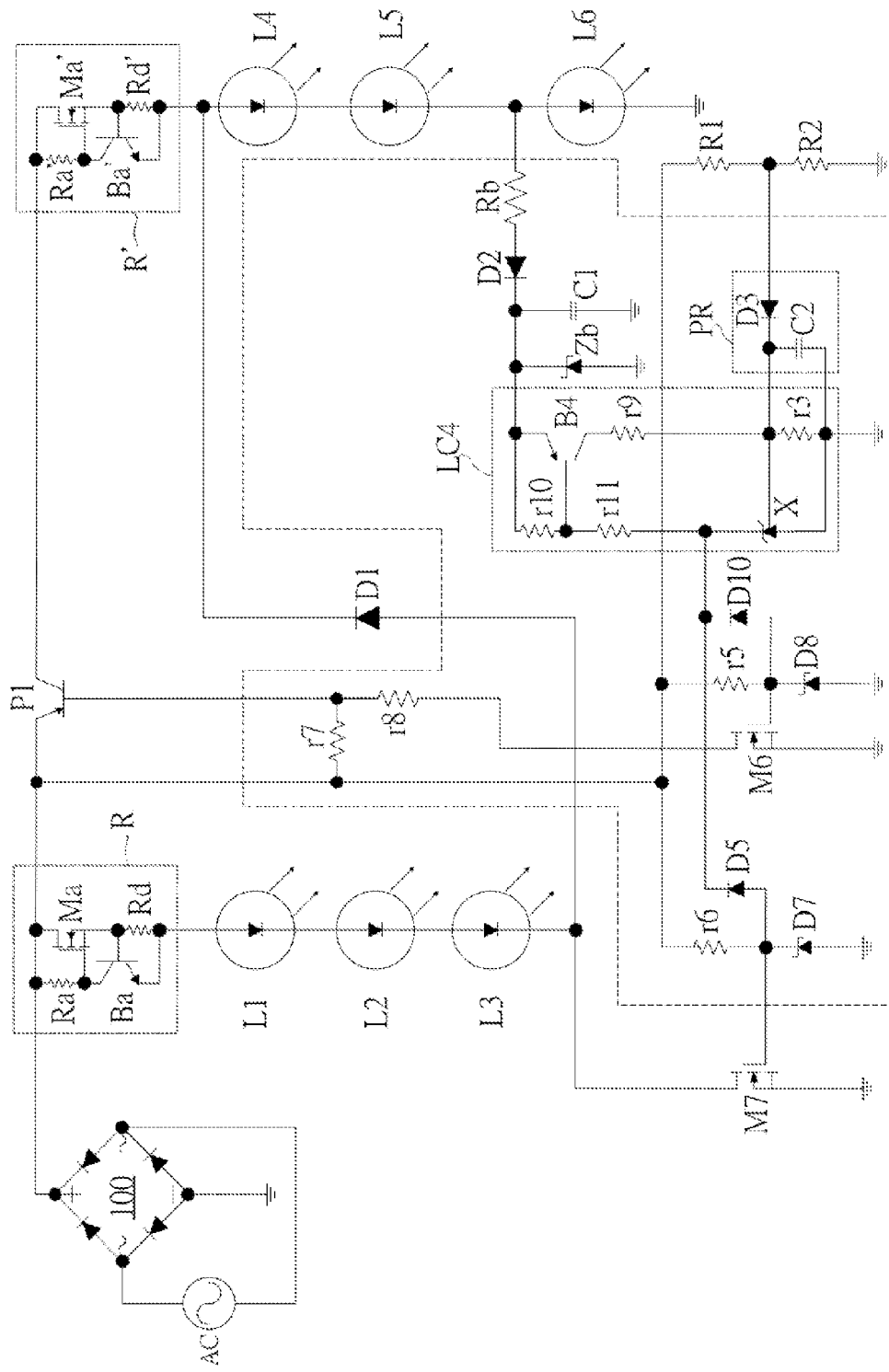
FIG. 7 illustrates a schematic diagram of an illuminating apparatus having the control circuit according to another embodiment of the present invention.

Please refer to FIG. 7, where the illuminating apparatus further comprises a current regulator R and a current regulator R'. The current regulator R comprises a NMOS Ma, a resistor Rd, a resistor Ra, and a BJT Ba. The NMOS Ma has its gate coupled to the collector of the BJT Ba and the low-side terminal of the resistor Ra, its source coupled to the base of the BJT Ba and the high-side terminal of the resistor Rd, and its drain coupled to the high-side DC output terminal of the rectifier 100 and the high-side terminal of the resistor Ra. The BJT Ba has its base coupled to the source of the NMOS Ma and the high-side terminal of the resistor Rd, its emitter coupled to the low-side terminal of the resistor Rd and the anode of the first extrinsic LED array, and its collector coupled to the gate of the NMOS Ma and the low-side terminal of the resistor Ra. The current regulator R' comprises a NMOS Ma', a resistor Rd', a resistor Ra', and a BJT Ba'. The structure of the current regulator R' is similar to that of the current regulator R, and the similarity is not repeated herein.

When the first and the second extrinsic LED array are lit up in parallel, the current flowing through the first extrinsic LED array would be regulated by the current regulator R at a preset current level of $$\frac{V_{be,Ba}}{Rd},$$

wherein $V_{be,Ba}$ represents the cut-in voltage of the BJT Ba and Rd represents the resistance of the current-sensing resistor Rd. Similarly, the current flowing through the second extrinsic LED array would be regulated by the current regulator R' at a preset current level of $$\frac{V_{be,Ba'}}{Rd'},$$

wherein $V_{be,Ba'}$ represents the cut-in voltage of the BJT Ba' and Rd' represents the resistance of the current-sensing resistor Rd'. On the contrary, when the first and the second extrinsic LED array are lit up in series, the current flowing through the first and second extrinsic LED array would be regulated by the current regulator R at a preset current level of $$\frac{V_{be,Ba}}{Rd}.$$

In this embodiment, the first switch M7 is an enhancement mode NMOS, the second switch P1 is a pnp type BJT, and the freewheeling switch D1 is a diode. The first switch M7 has its gate coupled to the first output terminal of the switch controller 120, its source coupled to ground, and its drain coupled to the cathode of the first extrinsic LED array and the anode of the freewheeling switch D1. The second switch P1 has its base coupled to the low-side terminal of the resistor r7 and the high-side terminal of the resistor r8, its emitter coupled to the high-side DC output terminal of the rectifier 100, the high-side terminal of the current regulator R, and the high-side terminal of the resistor r7, and its collector coupled to the high-side terminal of the current regulator R'.

The switch controller 120 comprises a peak rectifier PR (comprising a diode D3 and a capacitor C2), an interlock circuit LC4 (comprising an interlocking BJT B4, a resistor r3, a resistor r9, a resistor r10, a resistor r11, and an interlocking shunt regulator X), a current-limiting resistor Rb, a resistor r5, a resistor r6, a resistor r7, a resistor r8, a diode D2, a capacitor C1, a diode D5, a diode D10, a Zener diode D7, a Zener diode D8, and a Zener diode Zb. The switch controller 120 has its first input terminal (the anode of the diode D3) coupled to the output terminal of the voltage divider (resistors R1 and R2), its second input terminal (the high-side terminal of the resistor Rb) coupled to the anode of the LED sub-array L6, its first output terminal (the cathode of the Zener diode D7 and the low-side terminal of the resistor r6) coupled to the gate of the first switch M7, and its second output terminal (the low-side terminal of the resistor r7 and the high-side terminal of the resistor r8) coupled to the base of the second switch P1.

The diode D2 has its anode coupled to the low-side terminal of the resistor Rb and its cathode coupled to the high-side terminal of the capacitor C1, the cathode of the Zener diode Zb, and the emitter of the BJT B4. Swapping the diode D2 and the current-limiting resistor Rb is also feasible. The capacitor C1, connected in parallel with the Zener diode Zb, is coupled between the cathode of the diode D2 and ground. As a matter of fact, the LED sub-array L6 made up of one or more LEDs with an adequate forward voltage drop could serve as a DC voltage source so that the capacitor C1 could get charged up to the breakdown voltage of the Zener diode Zb through the diode D2 and the current-limiting resistor Rb whenever the LED sub-array L6 is lit up to show its forward voltage drop.

The voltage divider (resistors R1 and R2) is used for sampling the rectified sinusoidal voltage source and the peak rectifier PR is used for holding a sampled peak voltage serving as a signal input to the interlock circuit LC4. The interlocking BJT B4 has its base coupled to the low-side terminal of the resistor r10 and the high-side terminal of the resistor r11, its emitter coupled to the high-side terminal of the capacitor C1, the cathode of the Zener diode Zb, the cathode of the diode D2, and the high-side terminal of the resistor r10, and its collector coupled to the high-side terminal of the resistor r9. The interlocking shunt regulator X has its reference terminal coupled to the low-side terminal of the resistor r9, the high-side terminal of the resistor r3, the high-side terminal of the capacitor C2, and the cathode of the diode D3, its cathode coupled to the low-side terminal of the resistor r11, the cathode of the diode D10, and the cathode of the diode D5, and its anode coupled to the low-side terminal of the resistor r3 and the low-side terminal of the capacitor C2. The interlock circuit LC4 in conjunction with the peak rectifier PR controls the on or off state of the first switch M7 and the second switch P1 as well as the reverse or forward bias across the freewheeling switch D1.

The sampled peak voltage held across the capacitor C2 in the peak rectifier PR is compared with the reference voltage of the interlocking shunt regulator X ($V_{ref,X}$) for determining the operation mode of the interlock circuit LC4. If the sampled peak voltage is lower than the reference voltage $V_{ref,X}$, the interlocking shunt regulator X wouldn't get turned on to forward bias the emitter-base junction of the interlocking BJT B4 through the resistor r11, so the interlocking BJT B4 gets turned off. The turn-off of the interlocking BJT B4 wouldn't inject a boost voltage $$V_C \times \frac{r3}{r3 + r9},$$

higher than the reference voltage $V_{ref,X}$ by design, into the high-side terminal of the capacitor C2 and thus the interlocking shunt regulator X remains off. Such a latch-in-parallel mode takes place when the voltage source comes within the low range.

Conversely, if the sampled peak voltage is higher than the reference voltage $V_{ref,X}$, the interlocking shunt regulator X would get turned on to forward bias the emitter-base junction of the interlocking BJT B4 through the resistor r11, so the interlocking BJT B4 gets turned on. The turn-on of the interlocking BJT B4 would inject a boost voltage $$V_C \times \frac{r3}{r3 + r9},$$

higher than the reference voltage $V_{ref,X}$ by design, into the high-side terminal of the capacitor C2 and thus the interlocking shunt regulator X remains on. Such a latch-in-series mode takes place when the voltage source comes within the high range.

More specifically, when the voltage source comes within the low range, such as 100±20% V, even the upper limit of the sampled peak voltage, $$120\sqrt{2}\,\frac{R1}{R1+R2},$$

is kept below the reference voltage of the interlocking shunt regulator X ($V_{ref,X}$) by design, leading to the aforementioned latch-in-parallel mode within the low range. In this latch-in-parallel mode, the first switch M7 and the NMOS M6 are both turned on. The turn-on of the NMOS M6 would, in turn, turn on the second switch P1 by forward biasing its emitter-base junction through the resistor r8. With the turn-on of the first switch M7 and the second switch P1 at the same time, the freewheeling switch D1 is reverse biased to turn off. The first extrinsic LED array (comprising LED sub-arrays L1, L2, and L3) and the second extrinsic LED array (comprising LED sub-arrays L4, L5, and L6) are lit up in parallel within the low range and driven with a regulated current $$\left(\frac{V_{be,Ba}}{Rd}\right)\text{ and }\left(\frac{V_{be,Ba'}}{Rd'}\right),$$

respectively.

Conversely, when the voltage source comes within the high range, such as 200±20% V, even the lower limit of the sampled peak voltage, $$160\sqrt{2}\,\frac{R1}{R1+R2},$$

is kept above the reference voltage of the interlocking shunt regulator X ($V_{ref,X}$) by design, leading to the aforementioned latch-in-series mode within the high range. In this latch-in-series mode, the first switch M7 and the NMOS M6 are both turned off. The turn-off of the NMOS M6 would, in turn, turn off the second switch P1 by not forward biasing its emitter-base junction through the resistor r8. With the turn-off of the first switch M7 and the second switch P1 at the same time, the freewheeling switch D1 is forward biased to turn on. The first extrinsic LED array (comprising LED sub-arrays L1, L2, and L3) and the second extrinsic LED array (comprising LED sub-arrays L4, L5, and L6) are lit up in series within the high range and driven with a regulated current $$\left(\frac{V_{be,Ba}}{Rd}\right),$$

commonly.

Figure 8:
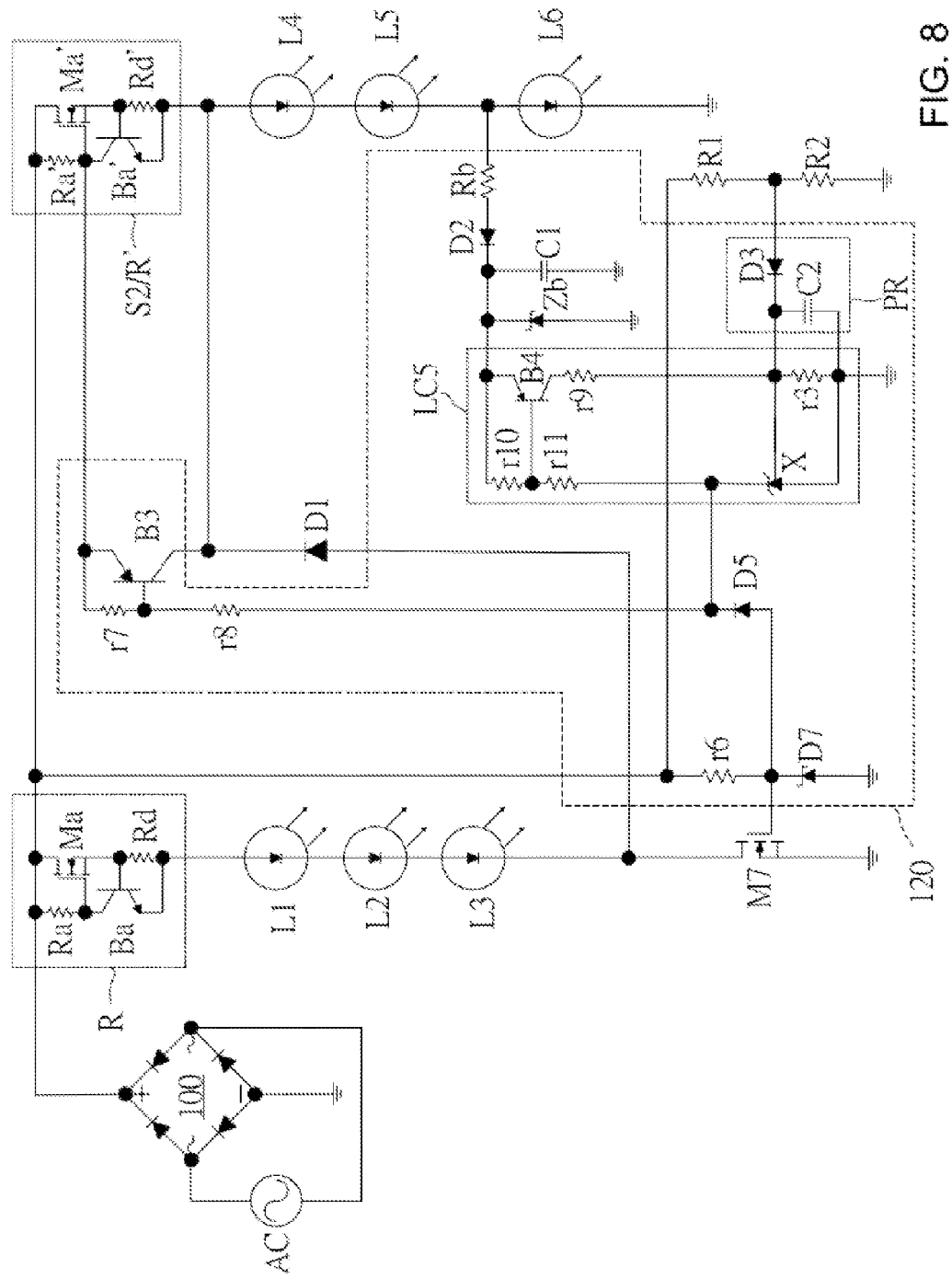
FIG. 8 illustrates a schematic diagram of an illuminating apparatus having the control circuit according to still another embodiment of the present invention.

Please refer to FIG. 8, where the illuminating apparatus further comprises a current regulator R and a current regulator R'. The structure of the current regulator R and the current regulator R' in FIG. 8 is similar to that in FIG. 7, and the similarity is not repeated herein. The current regulator R' also functions as a second switch S2.

When the first and the second extrinsic LED array are lit up in parallel, the current flowing through the first extrinsic LED array would be regulated by the current regulator R at a preset current level of $$\frac{V_{be,Ba}}{Rd},$$

wherein $V_{be,Ba}$ represents the cut-in voltage of the BJT Ba and Rd represents the resistance of the current-sensing resistor Rd. Similarly, the current flowing through the second extrinsic LED array would be regulated by the current regulator R' at a preset current level of $$\frac{V_{be,Ba'}}{Rd'},$$

wherein $V_{be,Ba'}$ represents the cut-in voltage of the BJT Ba' and Rd' represents the resistance of the current-sensing resistor Rd'. On the contrary, when the first and the second extrinsic LED array are lit up in series, the current flowing through the first and second extrinsic LED array would be regulated by the current regulator R at a preset current level of $$\frac{V_{be,Ba}}{Rd}.$$

In this embodiment, the first switch M7 is an enhancement mode NMOS, the second switch S2 is the current regulator R', and the freewheeling switch D1 is a diode. The first switch M7 has its gate coupled to the first output terminal of the switch controller 120, its source coupled to ground, and its drain coupled to the cathode of the first extrinsic LED array, and the anode of the freewheeling switch D1. The second switch S2 (the current regulator R') has its control terminal coupled to the second output terminal of the switch controller 120 (the emitter of the BJT B3 and the high-side terminal of the resistor r7), its first channel terminal coupled to the high-side DC output terminal of the rectifier 100, and its second channel terminal coupled to the anode of the second extrinsic LED array and the cathode of the freewheeling switch D1.

The switch controller 120 comprises a peak rectifier PR (comprising a diode D3 and a capacitor C2), an interlock circuit LC5 (comprising an interlocking BJT B4, a resistor r3, a resistor r9, a resistor r10, a resistor r11, and an interlocking shunt regulator X), a current-limiting resistor Rb, a resistor r6, a resistor r7, a resistor r8, a diode D2, a diode D5, a capacitor C1, a Zener diode D7, and a Zener diode Zb. The switch controller 120 has its first input terminal (the anode of the diode D3) coupled to the output terminal of the voltage divider (resistors R1 and R2), its second input terminal (the high-side terminal of the resistor Rb) coupled to the anode of the LED sub-array L6, its first output terminal (the cathode of the Zener diode D7 and the low-side terminal of the resistor r6) coupled to the gate of the first switch M7, and its second output terminal (the high-side terminal of the resistor r7 and the emitter of the BJT B3) coupled to the low-side terminal of the resistor Ra', the collector of BJT Ba', and the gate of the NMOS Ma' in the second switch S2.

In the present embodiment, the diode D2 has its anode coupled to the low-side terminal of the current-limiting resistor Rb and its cathode coupled to the high-side terminal of the capacitor C1. Swapping the diode D2 and the current-limiting resistor Rb is also feasible. The capacitor C1, connected in parallel with the Zener diode Zb, is coupled between the cathode of the diode D2 and ground. As a matter of fact, the LED sub-array L6 made up of one or more LEDs with an adequate forward voltage drop could serve as a DC voltage source so that the capacitor C1 could get charged up to the breakdown voltage of the Zener diode Zb through the diode D2 and the current-limiting resistor Rb whenever the LED sub-array L6 is lit up to show its forward voltage drop.

The voltage divider (resistors R1 and R2) is used for sampling the rectified sinusoidal voltage source and the peak rectifier PR is used for holding a sampled peak voltage serving as a signal input to the interlock circuit LC5. The interlocking BJT B4 has its base coupled to the low-side terminal of the resistor r10 and the high-side terminal of the resistor r11, its emitter coupled to the high-side terminal of the capacitor C1, the cathode of the Zener diode Zb, the cathode of the diode D2, and the high-side terminal of the resistor r10, and its collector coupled to the high-side terminal of the resistor r9. The interlocking shunt regulator X has its reference terminal coupled to the low-side terminal of the resistor r9, the high-side terminal of the resistor r3, the high-side terminal of the capacitor C2, and the cathode of the diode D3, its cathode coupled to the low-side terminal of the resistor r11 and the cathode of the diode D5, and its anode coupled to the low-side terminal of the resistor r3 and the low-side terminal of the capacitor C2. The interlock circuit LC5 in conjunction with the peak rectifier PR controls the on or off state of the first switch M7 and the second switch S2 (the current regulator R') as well as the reverse or forward bias across the freewheeling switch D1.

The sampled peak voltage held across the capacitor C2 in the peak rectifier PR is compared with the reference voltage of the interlocking shunt regulator X ($V_{ref,X}$) for determining the operation mode of the interlock circuit LC5. If the sampled peak voltage is lower than the reference voltage $V_{ref,X}$, the interlocking shunt regulator X wouldn't get turned on to forward bias the emitter-base junction of the interlocking BJT B4 through the resistor r11, so the interlocking BJT B4 gets turned off. The turn-off of the interlocking BJT B4 wouldn't inject a boost voltage $$V_C \times \frac{r3}{r3+r9},$$

higher than the reference voltage $V_{ref,X}$, by design, into the high-side terminal of the capacitor C2 and thus the interlocking shunt regulator X remains off. Such a latch-in-parallel mode takes place when the voltage source comes within the low range.

Conversely, if the sampled peak voltage is higher than the reference voltage $V_{ref,X}$, the interlocking shunt regulator X would get turned on to forward bias the emitter-base junction of the interlocking BJT B4 through the resistor r11, so the interlocking BJT B4 gets turned on. The turn-on of the interlocking BJT B4 would inject a boost voltage $$V_C \times \frac{r3}{r3+r9},$$

higher than the reference voltage $V_{ref,X}$, by design, into the high-side terminal of the capacitor C2 and thus the interlocking shunt regulator X remains on. Such a latch-in-series mode takes place when the voltage source comes within the high range.

More specifically, when the voltage source comes within the low range, such as 100±20% V, even the upper limit of the sampled peak voltage, $$120\sqrt{2}\,\frac{R1}{R1+R2},$$

is kept below the reference voltage of the interlocking shunt regulator X ($V_{ref,X}$) by design, leading to the aforementioned latch-in-parallel mode within the low range. In this latch-in-parallel mode, the first switch M7 is turned on and the BJT B3 is turned off. The gate and the source of the NMOS Ma' are not shorted out by the turn-off of the BJT B3, so the second switch S2 gets turned on. With the turn-on of the first switch M7 and the second switch S2 at the same time, the freewheeling switch D1 is reverse biased to turn off. The first extrinsic LED array (comprising LED sub-arrays L1, L2, and L3) and the second extrinsic LED array (comprising LED sub-arrays L4, L5, and L6) are lit up in parallel within the low range and driven with a regulated current $$\left(\frac{V_{be,Ba}}{Rd}\right) \text{ and } \left(\frac{V_{be,Ba'}}{Rd'}\right),$$

respectively.

Conversely, when the voltage source comes within the high range, such as 200±20% V, even the lower limit of the sampled peak voltage, $$160\sqrt{2}\,\frac{R1}{R1+R2},$$

is kept above the reference voltage of the interlocking shunt regulator X ($V_{ref,X}$) by design, leading to the aforementioned latch-in-series mode within the high range. In this latch-in-series mode, the first switch M7 is turned off and the BJT B3 is turned on. The turn-on of the BJT B3 would, in turn, turn off the second switch S2 by shorting out the gate and the source of the NMOS Ma'. With the turn-off of the first switch M7 and the second switch S2 at the same time, the freewheeling switch D1 is forward biased to turn on. The first extrinsic LED array (comprising LED sub-arrays L1, L2, and L3) and the second extrinsic LED array (comprising LED sub-arrays L4, L5, and L6) are lit up in series within the high range and driven with a regulated current $$\left(\frac{V_{be,Ba}}{Rd}\right),$$

commonly.

To sum up, the aforementioned preferred embodiments according to the present invention provide the LED illuminating apparatuses adaptable to dual-range (both 100±20% V and 200±20% V) operation to meet worldwide needs while being able to achieve tons of advantages: high driver efficiency, high power factor (PF), high product manufacturability, high product reliability, low bill of materials (BOM) cost, low maintenance cost, low parts count, low total harmonic distortion (THD), no conducted and radiated electromagnetic interference (EMI), no through-hole components, no electrolytic capacitors, no magnetic components, and tight line regulation especially when used in collocation with traditional AC-direct LED light engines.

While the present invention is susceptible to various modifications and alternative forms, specific examples thereof have been shown in the drawings and are herein described in detail. It should be understood, however, that the present invention should not be limited to the disclosed particular forms, but to the contrary, should cover all modifications, equivalents, and alternatives falling within the spirit and scope of the appended claims.

What is claimed is:

1. A control circuit for auto-configuring two strings of LED arrays to be lit up in series or in parallel, comprising:
    a first switch, coupled between ground and a cathode of a first extrinsic LED array;
    a second switch, coupled between at least one extrinsic voltage source and an anode of a second extrinsic LED array, wherein the at least one extrinsic voltage source provides a dual-range sinusoidal input;
    a freewheeling switch, having a channel lying between the cathode of the first extrinsic LED array and the anode of the second extrinsic LED array; and
    a switch controller, coupled to an output terminal of a voltage divider, for detecting a sampled voltage of the at least one extrinsic voltage source by the voltage divider and comparing the sampled voltage with an intrinsic reference or an intrinsic threshold voltage, wherein the switch controller comprises a peak rectifier as well as an interlock circuit, the peak rectifier is used for holding a sampled peak voltage of the at least one extrinsic voltage source serving as a signal input to the interlock circuit, and
    when the at least one extrinsic voltage source comes within a low range, the switch controller switches on the first switch and the second switch at the same time and the freewheeling switch is off, so that both the first extrinsic LED array and the second extrinsic LED array are lit up in parallel, and
    when the at least one extrinsic voltage source comes within a high range, the switch controller switches off the first switch and the second switch at the same time, and the freewheeling switch is on, so that the first and the second extrinsic LED array are lit up in series, wherein when the sampled peak voltage is less than the intrinsic reference or the intrinsic threshold voltage, the first and the second extrinsic LED array are lit up in a time-invariant parallel configuration locked down by the interlock circuit regardless of the dual-range sinusoidal input, when the sampled peak voltage is no less than the intrinsic reference or the intrinsic threshold voltage, the first and the second extrinsic LED array are lit up in a time-invariant series configuration locked down by the interlock circuit regardless of the dual-range sinusoidal input.

2. The control circuit for auto-configuring two strings of LED arrays to be lit up in series or in parallel according to claim 1, wherein each of the first switch and the second switch comprises a BJT or a MOSFET.

3. The control circuit for auto-configuring two strings of LED arrays to be lit up in series or in parallel according to claim 1, wherein the freewheeling switch comprises a diode, and an anode of the diode is coupled to the first switch, a cathode of the diode is coupled to the second switch.

4. The control circuit for auto-configuring two strings of LED arrays to be lit up in series or in parallel according to claim 1, wherein a channel of the freewheeling switch is coupled between the first switch and the second switch, and the freewheeling switch comprises a transistor having a first terminal, a second terminal and a control terminal, the channel of the freewheeling switch is between the first terminal and the second terminal, and the control terminal of the transistor is coupled to the switch controller.

5. The control circuit for auto-configuring two strings of LED arrays to be lit up in series or in parallel according to claim 4, wherein the transistor is a MOSFET, a BJT or a JFET.

6. The control circuit for auto-configuring two strings of LED arrays to be lit up in series or in parallel according to claim 1, further comprising a first current regulator and a second current regulator, the first current regulator coupled to the first extrinsic LED array, the second current regulator coupled to the second extrinsic LED array, and the switch controller comprising a first input terminal, a second input terminal, a first output terminal and a second output terminal, the first input terminal coupled to the output terminal of the voltage divider for detecting the sampled voltage of the at least one extrinsic voltage source, the second input terminal coupled to the second extrinsic LED array to receive a part of a forward voltage drop of the second extrinsic LED array, the first output terminal coupled to a control terminal of the first switch, the second output terminal coupled to a control terminal of the second switch, and the switch controller controlling the first switch and the second switch to be turned on or turned off correspondingly through signals from the first output terminal and the second output terminal according to signals received by the first and the second input terminal.

7. The control circuit for auto-configuring two strings of LED arrays to be lit up in series or in parallel according to claim 6, wherein the second current regulator is the second switch, and the second current regulator comprises two transistors.

8. The control circuit for auto-configuring two strings of LED arrays to be lit up in series or in parallel according to claim 1, wherein the switch controller comprises:
    a diode, having its anode coupled to the second extrinsic LED array;
    a current-limiting resistor, coupled to the cathode of the diode; and
    a first capacitor, coupled between the current-limiting resistor and ground.

9. The control circuit for auto-configuring two strings of LED arrays to be lit up in series or in parallel according to claim 8, wherein the switch controller further comprises a Zener diode, and the Zener diode is connected in parallel with the first capacitor.

10. The control circuit for auto-configuring two strings of LED arrays to be lit up in series or in parallel according to claim 1, wherein the peak rectifier is coupled to an output of the voltage divider.

11. The control circuit for auto-configuring two strings of LED arrays to be lit up in series or in parallel according to claim 8, wherein the
    interlock circuit coupled to the peak rectifier, the interlock circuit comprising an interlocking BJT and an interlocking MOSFET, wherein an emitter of the interlocking BJT is coupled to the first capacitor, a collector of the interlocking BJT is coupled to the gate of the interlocking MOSFET.

12. The control circuit for auto-configuring two strings of LED arrays to be lit up in series or in parallel according to claim 8, wherein the
    interlocking circuit, coupled to the current-limiting resistor, the current-limiting circuit comprises a first interlocking BJT and a second interlocking BJT, an emitter of the first interlocking BJT is coupled to the first capacitor, a collector of the first interlocking BJT is coupled to the base of the second interlocking BJT.

13. The control circuit for auto-configuring two strings LED arrays to be lit up in series or in parallel according to claim 12, wherein a collector of the second interlocking BJT is coupled to the first switch through a diode for controlling on or off states of the first switch, and a collector of the second interlocking BJT is coupled to a transistor switch through another diode for controlling on or off states of the second switch and the freewheeling switch.

14. The control circuit for auto-configuring two strings of LED arrays to be lit up in series or in parallel according to claim 8, wherein the interlock circuit further comprises a interlocking BJT, and wherein a emitter of the interlocking BJT is coupled to the first capacitor, and a collector of the interlocking BJT is coupled to the peak rectifier.

15. The control circuit for auto-configuring two strings of LED arrays to be lit up in series or in parallel according to claim 14, further comprising:
 a shunt regulator, a cathode and an anode of the shunt regulator coupled to two terminals of the first capacitor;
 another voltage divider, an output terminal of the another voltage divider coupled to a reference terminals of the shunt regulator, and two terminals of the another voltage divider coupled to two terminals of the first capacitor; and
 a comparator, having an inverting input terminal, a non-inverting input terminal and an output terminal, the non-inverting input terminal coupled to the output terminal of the another voltage divider, the inverting input terminal coupled to the peak rectifier, and the output terminal coupled to the first switch, the output terminal further coupled to the second switch through a transistor, for controlling the on or off state of the first and the second switch.

16. The control circuit for auto-configuring two strings of LED arrays to be lit up in series or in parallel according to claim 14, wherein the switch controller further comprises:
 a shunt regulator, wherein a cathode and an anode of the shunt regulator are coupled to two terminals of the first capacitor;
 another voltage divider, wherein an output terminal of the another voltage divider is coupled to a reference terminal of the shunt regulator, and two terminals of the another voltage divider are coupled to the two terminals of the first capacitor;
 a first comparator, having a first inverting input terminal, a first non-inverting input terminal and a first output terminal, the first non-inverting input terminal coupled to the output terminal of the another voltage divider, the first inverting input terminal coupled to the peak rectifier, and the first output terminal coupled the first switch, for controlling on or off state of the first switch; and
 a second comparator, having a second inverting input terminal, a second non-inverting input terminal and a second output terminal, the second non-inverting input terminal coupled to the output terminal of the another voltage divider, the second inverting input terminal coupled to the first output terminal of the first comparator, and the second output terminal coupled to the second switch through a transistor, for controlling on or off states of the second switch.

17. An integrated circuit having a control circuit for controlling LEDs, comprising:
 a substrate; and
 the control circuit for auto-configuring two strings of LED arrays to be lit up in series or in parallel according to claim 1, wherein the control circuit is integrated on the substrate.

18. The integrated circuit having the control circuit for controlling LEDs according to claim 17, wherein the voltage divider comprises two resistors, the two resistors are integrated onto the substrate, one of the two resistors is disposed outside of the substrate, or both of the resistors are disposed outside the substrate.

19. An illuminating apparatus, comprising:
 a control circuit according to claim 1;
 at least one rectifier, coupled to the at least one extrinsic voltage source; and
 the first extrinsic LED array and the second extrinsic LED array under control of the control circuit, wherein the first extrinsic LED array or the second extrinsic LED array each comprises a plurality of LED sub-arrays.

20. The illuminating apparatus according to claim 19, wherein the at least one rectifier comprises a first rectifier and a second rectifier, the at least one extrinsic voltage source comprises a first extrinsic voltage source and a second extrinsic voltage source, an amplitude and a range provided by the second extrinsic voltage source are twice as high and wide as another amplitude and another range provided by the first extrinsic voltage source, the first extrinsic voltage source is coupled to the first rectifier through a switch, and the second extrinsic voltage source is coupled to the second rectifier through another switch.

\* \* \* \* \*